(12) United States Patent
Fushimi et al.

(10) Patent No.: US 9,586,499 B2
(45) Date of Patent: Mar. 7, 2017

(54) FUEL CELL VEHICLE

(71) Applicant: HONDA MOTOR CO., LTD., Minato-Ku, Tokyo (JP)

(72) Inventors: Takaaki Fushimi, Utsunomiya (JP); Atsushi Amano, Utsunomiya (JP); Takanori Suzuki, Utsunomiya (JP); Kosuke Nishiyama, Shioya-Gun (JP); Yusuke Gotou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 14/818,562

(22) Filed: Aug. 5, 2015

(65) Prior Publication Data

US 2016/0039308 A1    Feb. 11, 2016

(30) Foreign Application Priority Data

Aug. 6, 2014   (JP) ................. 2014-160053

(51) Int. Cl.
*B60K 1/00* (2006.01)
*B60L 11/18* (2006.01)
*B60K 1/04* (2006.01)

(52) U.S. Cl.
CPC ............ *B60L 11/1881* (2013.01); *B60K 1/00* (2013.01); *B60K 1/04* (2013.01); *B60K 2001/0411* (2013.01); *B60Y 2306/01* (2013.01)

(58) Field of Classification Search
CPC .. B60L 11/1881; B60L 11/18; B60L 11/1818; B60L 11/1883; B60L 11/1898; B60L 11/1896; B60K 1/00; B60K 1/04; B60K 2001/0411; B60K 2001/0405
See application file for complete search history.

(56) References Cited

U.S. PATENT DOCUMENTS

| 5,632,351 A | 5/1997 | Ishiyama | |
|---|---|---|---|
| 5,641,031 A * | 6/1997 | Riemer | B60K 1/04 180/68.5 |
| 5,662,184 A * | 9/1997 | Riemer | B60K 1/00 180/65.1 |
| 6,994,178 B2 * | 2/2006 | Mizuno | B60K 1/04 180/299 |

(Continued)

FOREIGN PATENT DOCUMENTS

| JP | H07-231672 A | 8/1995 |
|---|---|---|
| JP | 2002-370544 A | 12/2002 |

(Continued)

OTHER PUBLICATIONS

Office Action dated Nov. 22, 2016 issued over the corresponding Japanese Patent Application 2014-160053 with the English translation of the pertinent portion.

*Primary Examiner* — James M Dolak
(74) *Attorney, Agent, or Firm* — Carrier Blackman & Associates, P.C.; Joseph P. Carrier; William D. Blackman (57) ABSTRACT

A fuel cell electric automobile includes a fuel cell stack, a traction motor, a first control device for controlling output of the fuel cell stack, and a second control device for controlling electrical energy supplied to the traction motor. The first control device is provided vertically above the fuel cell stack, and the second control device is provided vertically below the fuel cell stack and on a lateral side of the traction motor.

10 Claims, 5 Drawing Sheets

(56) References Cited

U.S. PATENT DOCUMENTS

| | | | | |
|---|---|---|---|---|
| 7,144,039 | B2* | 12/2006 | Kawasaki | B60K 1/04 180/232 |
| 7,726,429 | B2* | 6/2010 | Suzuki | B60K 1/00 180/232 |
| 8,016,063 | B2* | 9/2011 | Tsuchiya | B60K 1/04 180/68.1 |
| 8,371,406 | B2* | 2/2013 | Masaki | B60K 1/04 180/299 |
| 8,459,385 | B2* | 6/2013 | Katano | B60L 11/1892 180/65.22 |
| 8,459,399 | B2* | 6/2013 | Ohashi | B60K 1/04 180/312 |
| 8,985,259 | B2* | 3/2015 | Ozawa | B60K 1/04 180/292 |
| 9,079,508 | B2* | 7/2015 | Naito | B60K 1/04 |
| 9,333,845 | B2* | 5/2016 | Winter | B60K 1/04 |
| 9,371,009 | B2* | 6/2016 | Ishikawa | B62D 21/15 |
| 2002/0189873 | A1 | 12/2002 | Mizuno | |

FOREIGN PATENT DOCUMENTS

| | | |
|---|---|---|
| JP | 2004-181979 A | 7/2004 |
| JP | 2014-076716 A | 5/2014 |
| JP | 2014-113910 A | 6/2014 |

* cited by examiner

FUEL CELL VEHICLE

CROSS-REFERENCE TO RELATED APPLICATION

This application is based upon and claims the benefit of priority from Japanese Patent Application No. 2014-160053 filed on Aug. 6, 2014, the contents of which are incorporated herein by reference.

BACKGROUND OF THE INVENTION

Field of the Invention

The present invention relates to a fuel cell vehicle including a fuel cell for generating electrical energy by electrochemical reactions of a fuel gas and an oxygen-containing gas and a traction motor driven by the electrical energy generated by the fuel cell.

Description of the Related Art

For example, in a solid polymer electrolyte fuel cell, an electrolyte membrane (polymer ion exchange membrane) is interposed between an anode and a cathode to form a membrane electrode assembly (MEA). The membrane electrode assembly is sandwiched between a pair of separators to form a power generation cell. In the fuel cell, generally, a predetermined number of power generation cells are stacked together to form a fuel cell stack, e.g., mounted in a fuel cell vehicle (fuel cell electric automobile, etc.).

In the fuel cell vehicle, for example, as a technique aimed to achieve loosening of constraints of a passenger space, mount structure for a fuel cell system disclosed in Japanese Laid-Open Patent Publication No. 2002-370544 is known. This vehicle mount structure is equipped with a motor for driving a vehicle shaft, a fuel cell for supplying electrical energy to the motor, and a control unit for controlling operation of the motor and the fuel cell. The control unit is provided above the fuel cell and the motor is provided below the fuel cell. In this state, the motor, the fuel cell, and the control unit are provided in the same vehicle body space of the electric automobile.

SUMMARY OF THE INVENTION

However, in the above vehicle mount structure, since the control unit itself is considerably large equipment, when the control unit is provided above the fuel cell, a large installation space is required above the fuel cell. Therefore, the fuel cell system has a large height as a whole.

The present invention has been made to solve the problem of this type, and an object of the present invention is to provide a fuel cell vehicle which makes it possible to effectively reduce the height of the system as a whole, and improve the space efficiency, with a simple structure.

A fuel cell vehicle according to the present invention includes a fuel cell for generating electrical energy by electrochemical reactions of a fuel gas and an oxygen-containing gas and a traction motor driven by the electrical energy generated by the fuel cell. Further, the fuel cell vehicle includes a first control device for controlling output of the fuel cell and a second control device for controlling electrical energy supplied to the traction motor.

Further, the first control device is provided vertically above the fuel cell, and the second control device is provided vertically below the fuel cell and on a lateral side of the traction motor.

In the present invention, the control unit is separated into the first control device and the second control device. The second control device is provided vertically below the fuel cell and on the lateral side of the traction motor. Therefore, in comparison with the structure where the control unit having the first control device and the second control device formed as a single piece component and the traction motor are arranged in the vertical direction, with the simple structure, it is possible to effectively reduce the height of the system as a whole. Accordingly, it becomes possible to effectively improve the space efficiency of the fuel cell vehicle.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
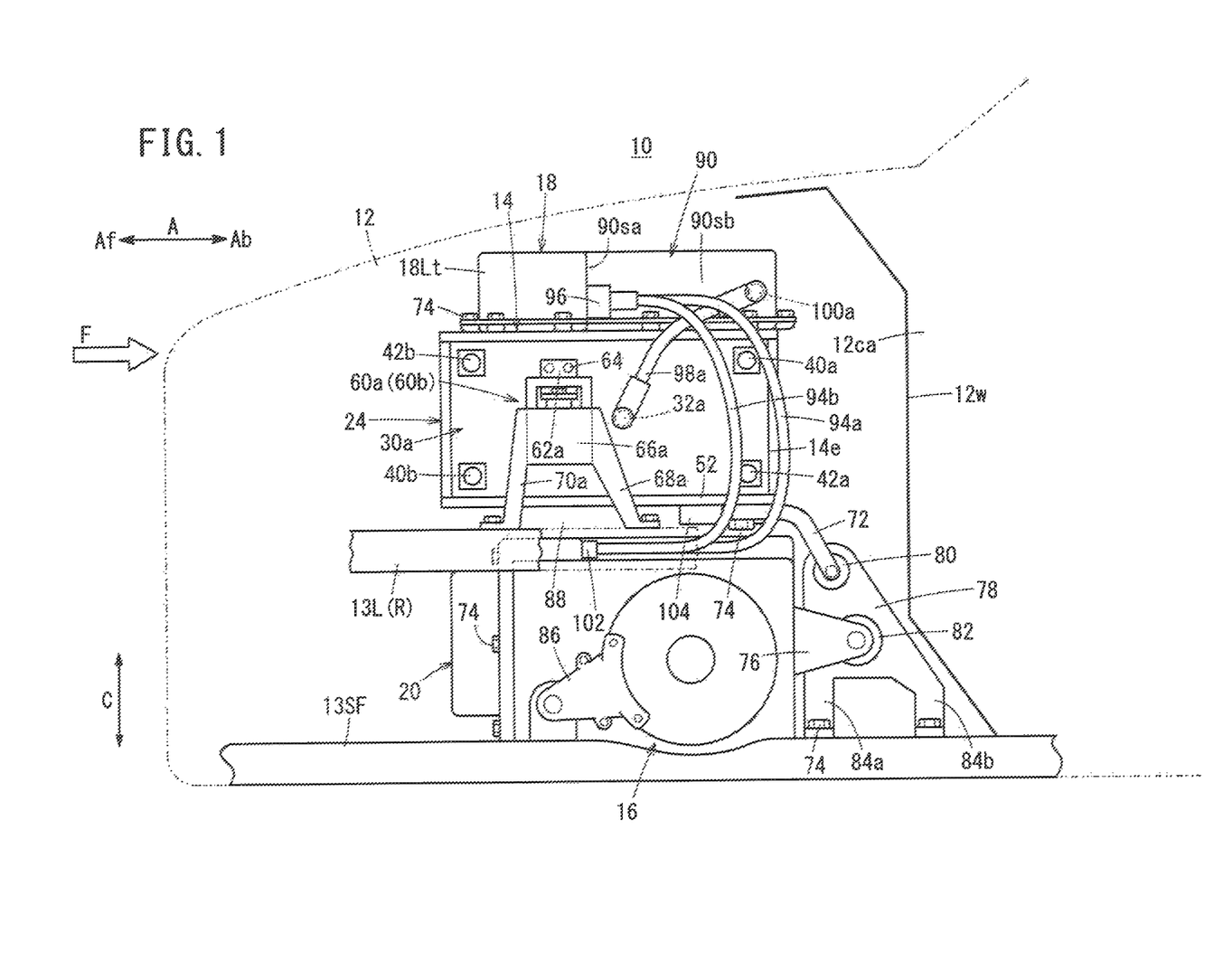
FIG. 1 is a schematic side view showing a front portion of a fuel cell electric automobile according to an embodiment of the present invention.
Figure 2:
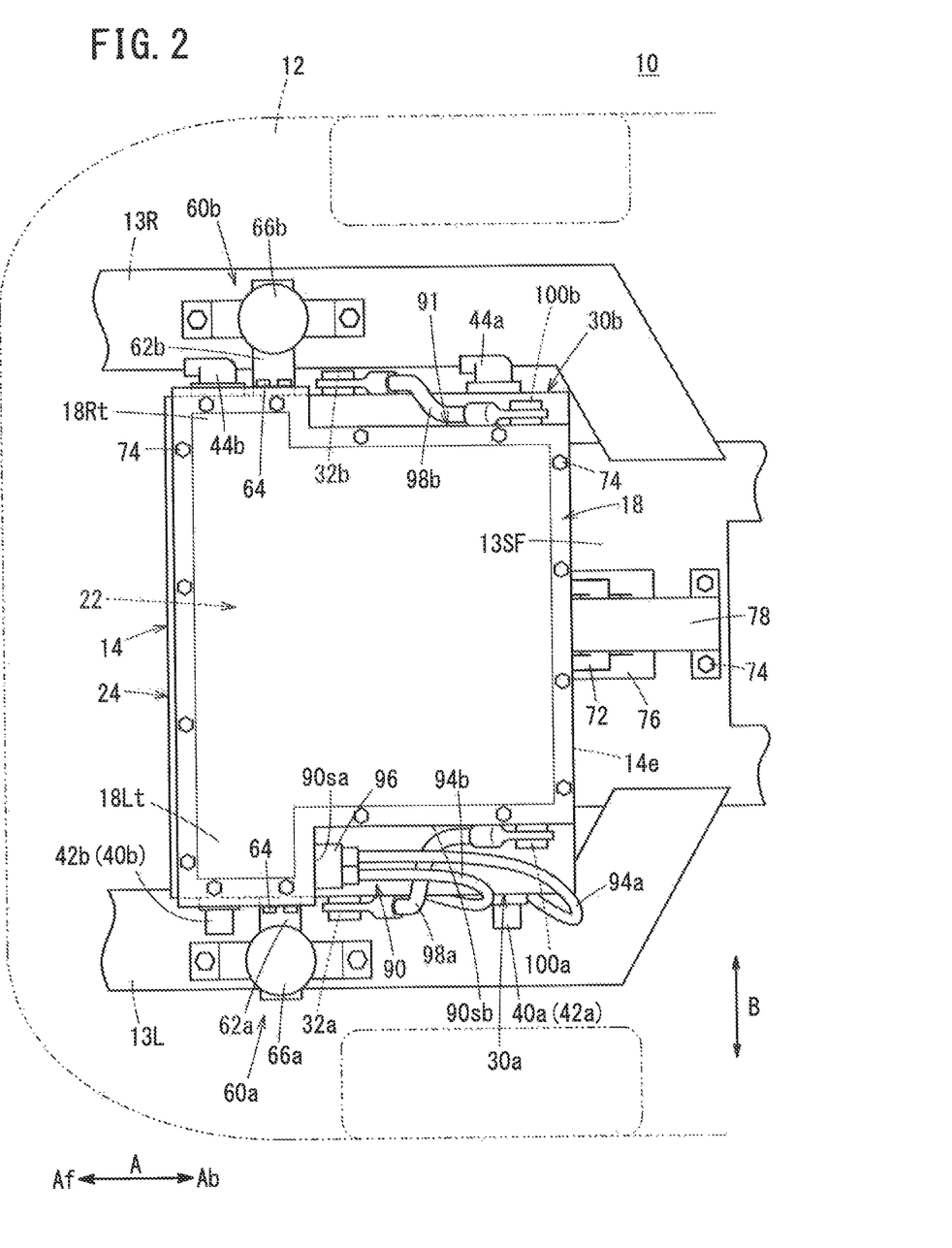
FIG. 2 is a schematic plan view showing the front portion of the fuel cell electric automobile.

As shown in FIGS. 1 and 2, a fuel cell electric automobile (fuel cell vehicle) 10 according to an embodiment of the present invention has a motor room (front box) 12. The motor room 12 is isolated from a vehicle compartment 12ca by a partition wall member (dashboard) 12w (see FIG. 1).

In the motor room 12, first vehicle frames (e.g., side frames) 13R, 13L as parts of a vehicle frame extend in a direction indicated by an arrow A. A second vehicle frame (e.g., cross member) 13SF extends in the direction indicated by the arrow A below the first vehicle frames 13R, 13L.

Figure 3:
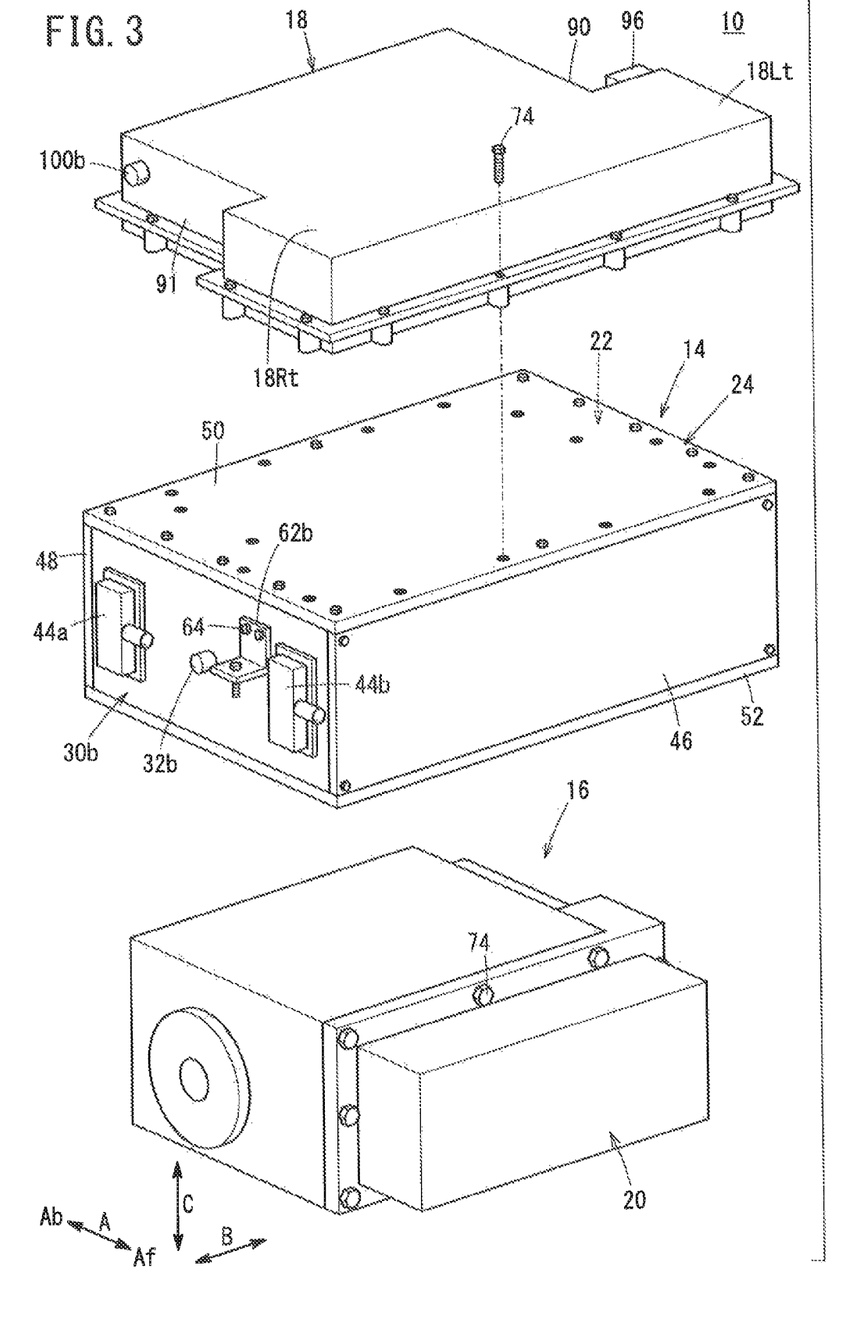
FIG. 3 is an exploded perspective view showing the fuel cell electric automobile.

As shown in FIGS. 1 to 3, the fuel cell electric automobile 10 includes a fuel cell stack 14, a traction motor 16, a first control device 18, and a second control device 20. Schematically, as shown in FIGS. 1 and 2, the fuel cell stack 14 is mounted on the first vehicle frames 13R, 13L, and the first control device 18 is provided vertically above the fuel cell stack 14. The traction motor 16 is mounted on the second vehicle frame 13SF vertically below the fuel cell stack 14 such that the axial direction of the traction motor 16 extends in a vehicle width direction indicted by an arrow B. The second control device 20 is provided vertically below the fuel cell stack 14, on a lateral side of the traction motor 16.

Figure 4:
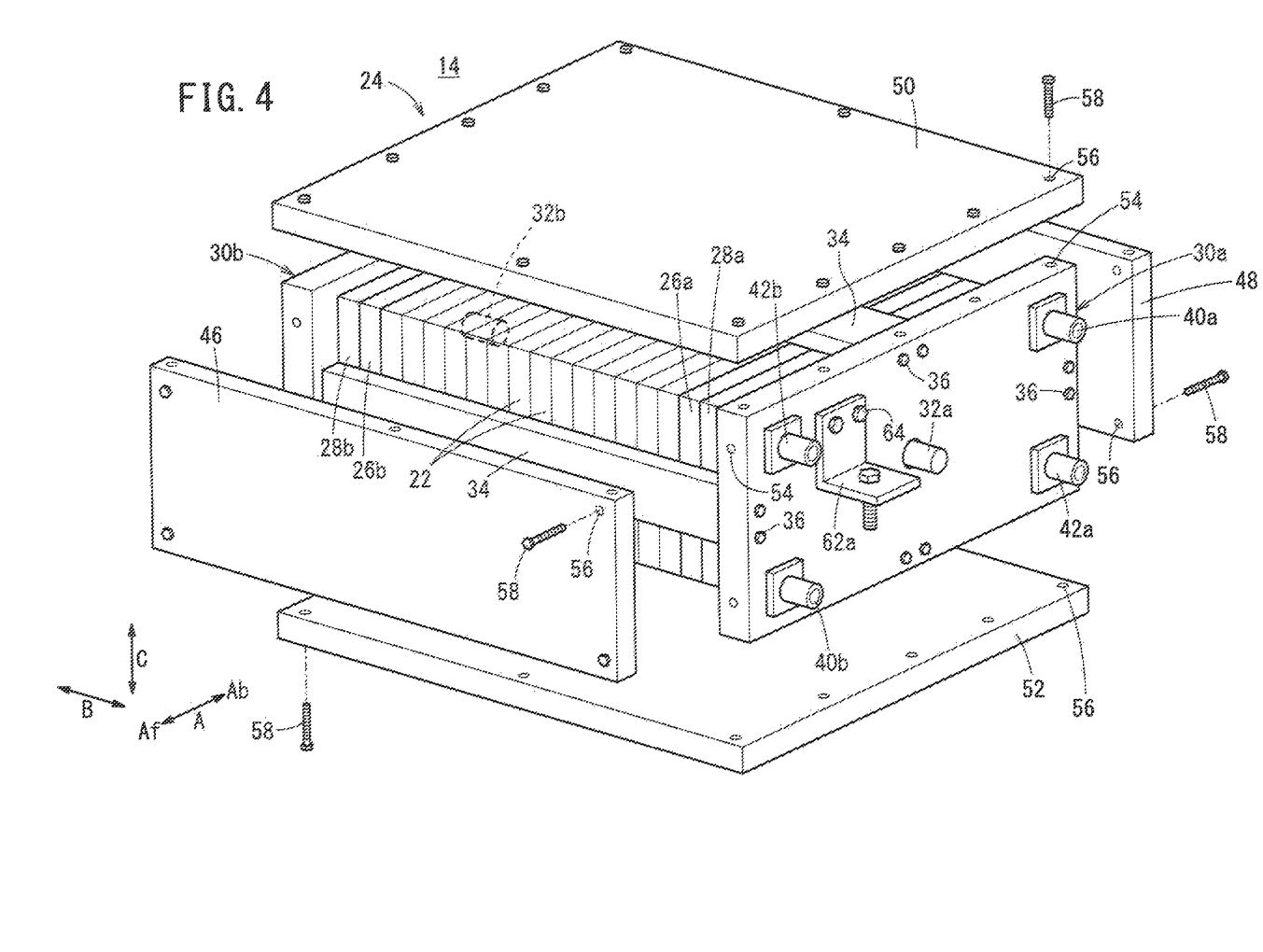
FIG. 4 is a partial exploded perspective view showing a fuel cell stack of a fuel cell electric automobile.

As shown in FIGS. 3 and 4, the fuel cell stack 14 includes a plurality of fuel cells 22 that are stacked together, and a casing (fuel cell casing) 24 containing the stacked fuel cells 22. As shown in FIG. 4, electrode surfaces of the fuel cells 22 are oriented upright, and the fuel cells 22 are stacked in the vehicle width direction indicated by the arrow B intersecting with the vehicle length direction (vehicle longitudinal direction) of the fuel cell electric automobile 10 indicated by the arrow A.

At one end of the fuel cells 22 in the stacking direction, a first terminal plate 26a is provided. A first insulating plate 28a is provided outside the first terminal plate 26a, and a first end plate 30a is provided outside the first insulating plate 28a. At the other end of the fuel cells 22 in the stacking direction, a second terminal plate 26b is provided. A second insulating plate 28b is provided outside the second terminal plate 26b, and a second end plate 30b is provided outside the second insulating plate 28b.

A first power output terminal 32a extends outward from a substantially central position of the first end plate 30a having a laterally elongated shape (rectangular shape). The first power output terminal 32a may extend from a position deviated from the central position of the first end plate 30a. The first power output terminal 32a is connected to the first terminal plate 26a. A second power output terminal 32b extends outward from a substantially central position of the second end plate 30b having a laterally elongated shape (rectangular shape). The second power output terminal 32b may extend from a position deviated from the central position of the second end plate 30b. The second power output terminal 32b is connected to the second terminal plate 26b.

Coupling bars 34 each having a constant length are provided between the first end plate 30a and the second end plate 30b at central positions of respective sides of the first end plate 30a and the second end plate 30b. Both ends of each of the coupling bars 34 are fixed respectively to the first end plate 30a and the second end plate 30b using screws 36 for applying a tightening load to the stacked fuel cells 22 in the stacking direction indicated by the arrow B.

Though not shown, each of the fuel cells 22 includes a membrane electrode assembly and a pair of separators sandwiching the membrane electrode assembly. The membrane electrode assembly includes a cathode, an anode, and a solid polymer electrolyte membrane interposed between the cathode and the anode. An oxygen-containing gas such as the air is supplied to the cathode, and a fuel gas such as a hydrogen gas is supplied to the anode for generating electrical energy by electrochemical reactions of the oxygen-containing gas and the fuel gas.

An oxygen-containing gas supply manifold member 40a, an oxygen-containing gas discharge manifold member 40b, a fuel gas supply manifold member 42a, and a fuel gas discharge manifold member 42b are attached to the first end plate 30a. An oxygen-containing gas is supplied from the oxygen-containing gas supply manifold member 40a to the cathode of each fuel cell 22, and the oxygen-containing gas consumed at the cathode is discharged through the oxygen-containing gas discharge manifold member 40b. A fuel gas is supplied from the fuel gas supply manifold member 42a to the anode of each fuel cell 22, and the fuel gas consumed at the anode is discharged through the fuel gas discharge manifold member 42b.

As shown in FIGS. 2 and 3, a coolant supply manifold member 44a and a coolant discharge manifold member 44b are attached to the second end plate 30b. A coolant is supplied from the coolant supply manifold member 44a to each fuel cell 22 or a predetermined number of fuel cells 22, and the coolant used for cooling is discharged through the coolant discharge manifold member 44b.

As shown in FIG. 4, two sides (two surfaces) of the casing 24 at opposite ends in the vehicle width direction indicted by the arrow B are formed by the first end plate 30a and the second end plate 30b. Two sides (two surfaces) of the casing 24 at opposite ends in the vehicle length direction indicated by the arrow A are formed by a front side panel 46 and a rear side panel 48 each having a laterally elongated plate shape. Two sides (two surfaces) of the casing 24 at opposite ends in the vehicle height direction indicated by the arrow C are formed by an upper side panel 50 and a lower side panel 52. Each of the upper side panel 50 and the lower side panel 52 has a laterally elongated plate shape.

A plurality of screw holes 54 are formed on side portions of the first end plate 30a and the second end plate 30b, for attachment of the front side panel 46, the rear side panel 48, the upper side panel 50, and the lower side panel 52 (hereinafter simply referred to as the panel group). Screws 58 are screwed into the respective screw holes 54 through respective holes 56 formed in the panel group. In this manner, the casing 24 is assembled.

As shown in FIGS. 1 and 2, the fuel cell stack 14 is equipped with side mounts 60a, 60b for supporting the fuel cell stack 14 to fix the fuel cell stack 14 to first vehicle frames 13R, 13L. As shown in FIGS. 1 and 4, the side mount 60a has a plate member 62a bent in an L-shape in cross section. The plate member 62a is fixed to a front side of the first end plate 30a in the direction indicated by the arrow Af using a plurality of screws 64.

As shown in FIGS. 1 and 2, the side mount 60a includes a shock buffer (liquid seal mount) 66a fixed to one end of the fuel cell stack 14 in the vehicle width direction using the plate member 62a. The shock buffer 66a has two attachment sections 68a, 70a for attaching the shock buffer 66a to the first vehicle frame 13L.

The side mount 60b shown in FIG. 2 has the same structure as the side mount 60a. The constituent elements of the side mount 60b that are identical to those of the side mount 60a are labeled with the same reference numeral (with suffix b instead of a), and detailed description thereof is omitted. The side mount 60b is fixed to the first vehicle frame 13R using screws.

Figure 5:
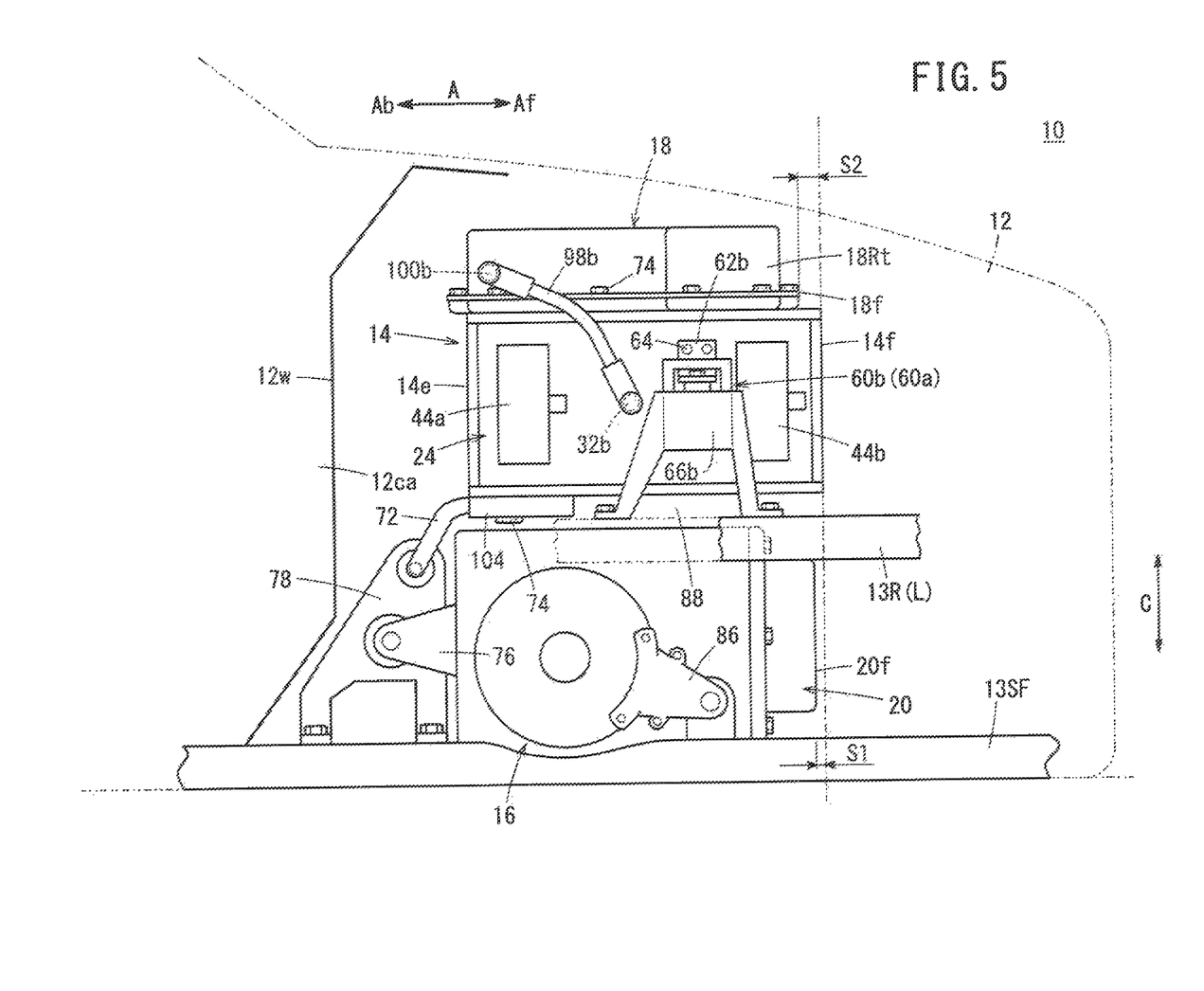
FIG. 5 is a schematic side view showing the front portion of the fuel cell electric automobile, as viewed from the other side.

As shown in FIGS. 1 and 5, one end of each of paired rear mounts 72 is fixed to a rear portion of the fuel cell stack 14 in the vehicle longitudinal direction using screws 74. One end of each of motor mounts 76 is attached to a rear portion of the traction motor 16 in the vehicle longitudinal direction. The rear mounts 72 and the motor mounts 76 are formed integrally with a coupling mount 78 to form a single piece component, and the coupling mount 78 is fixed to the second vehicle frame 13SF using screws.

Another end of each of the rear mounts 72 is fixed to an upper end of the coupling mount 78 through a rubber member 80. Another end of each of the motor mounts 76 is fixed to a lower end of the coupling mount 78 through a rubber member 82. Attachment sections 84a, 84b are provided on a lower portion of the coupling mount 78, and the attachment sections 84a, 84b are fixed to the second vehicle frame 13SF using screws 74.

A motor mount 86 is provided at a front portion of the traction motor 16 in the vehicle longitudinal direction. The motor mount 86 is fixed to the second vehicle frame 13SF using screws. A space 88 is formed between a lower surface of the fuel cell stack 14 and an upper surface of the traction motor 16.

The first control device 18 functions as a voltage and current control unit (VCU) for controlling the output of the fuel cell stack 14. As shown in FIGS. 1 to 3 and 5, the first control device 18 is fixed to the casing 24 using a plurality of screws 74 in a state where the first control device 18 is placed within an upper surface area of the casing 24, which makes up part of the fuel cell stack 14.

As shown in FIG. 2, the first control device 18 has a projection 18Lt and a projection 18Rt on the front side. The projection 18Lt protrudes outward from one side of the first control device 18 in the vehicle width direction, and the projection 18Rt protrudes outward from the other side thereof in the vehicle width direction. A recess 90 is provided adjacent to the projection 18Lt. As shown in FIGS. 1 and 2, a first connector 96 is provided on a side surface (surface extending in the direction indicted by the arrow B) 90*sa* of the recess 90 for connection with one end of each of high voltage cables 94*a*, 94*b*.

A connection terminal 100*a* is provided on a side surface (surface extending in the direction indicated by the arrow A) 90*sb* of the recess 90 for connection with one end of a high voltage cable 98*a*. The other end of the high voltage cable 98*a* is connected to the first power output terminal 32*a* of the fuel cell stack 14.

As shown in FIGS. 2 and 5, a recess 91 is formed adjacent to the projection 18Rt of the first control device 18. A connection terminal 100*b* is provided on a side surface (surface extending in the direction indicated by the arrow A) of the recess 91 for connection with one end of a high voltage cable 98*b*. As shown in FIG. 5, the other end of the high voltage cable 98*b* is connected to the second power output terminal 32*b* of the fuel cell stack 14.

The second control device 20 functions as a power control unit (PCU) for controlling electrical energy supplied to the traction motor 16. As shown in FIGS. 1, 3, and 5, the second control device 20 is provided on the front side of the traction motor 16 in the vehicle longitudinal direction and within an area of the size of the traction motor 16 in the vehicle width direction, and the second control device 20 is fixed to the traction motor 16 using a plurality of screws 74.

As shown in FIG. 1, a second connector 102 is provided above the second control device 20 for connection with the other end of each of the high voltage cables 94*a*, 94*b*. As shown in FIGS. 1 and 2, the high voltage cables 94*a*, 94*b* are provided such that the high voltage cables 94*a*, 94*b* are not overlapped with a rear surface 14*e* of the fuel cell stack 14 in a front view in the vehicle longitudinal direction. The first connector 96 and the second connector 102 are covered with resin. In a plan view of the fuel cell stack 14, the first connector 96 and the second connector 102 are placed within a plane surface area of the fuel cell stack 14 (see FIG. 2). As shown in FIG. 1, the second connector 102 is provided vertically below the fuel cell stack 14, and vertically above the traction motor 16.

As shown in FIG. 5, a front end 20*f* of the second control device 20 in the vehicle longitudinal direction is spaced backwardly in the vehicle longitudinal direction from a front end 14*f* of the fuel cell stack 14 in the vehicle longitudinal direction by a distance S1. A front end 18*f* of the first control device 18 in the vehicle longitudinal direction is spaced backwardly in the vehicle longitudinal direction from the front end 14*f* of the fuel cell stack 14 in the vehicle longitudinal direction by a distance S2.

A cell voltage detection device 104 for detecting the cell voltage of the fuel cell stack 14 is attached to a lower surface of the fuel cell stack 14. The cell voltage detection device 104 is placed within the lower surface area (within the space 88) of the fuel cell stack 14.

Operation of the fuel cell stack 14 in this fuel cell electric automobile 10 will be described below.

Firstly, as shown in FIG. 4, an oxygen-containing gas is supplied from the oxygen-containing gas supply manifold member 40*a* at the first end plate 30*a*. A fuel gas such as a hydrogen-containing gas is supplied from the fuel gas supply manifold member 42*a* at the first end plate 30*a*. In the meanwhile, as shown in FIG. 3, a coolant such as pure water, ethylene glycol, oil, or the like is supplied from the coolant supply manifold member 44*a* at the second end plate 30*b*.

Thus, in each of the fuel cells 22, the oxygen-containing gas is supplied to the cathode and the fuel gas is supplied to the anode for inducing electrochemical reactions of the oxygen-containing gas and the fuel gas to generate electrical energy. The fuel cells 22 are electrically connected in series, and direct current electrical energy is generated by power generation between the first power output terminal 32*a* and the second power output terminal 32*b*, which are a pair of electrode terminals of the fuel cell stack 14.

As shown in FIGS. 1 and 5, the generated electrical energy is supplied to the first control device 18 through the high voltage cable 98*a* connected to the first power output terminal 32*a* and the high voltage cable 98*b* connected to the second power output terminal 32*b*.

In the first control device 18, voltage control and current control are implemented, and electrical energy is supplied to the second control device 20 electrically connected to the first control device 18 through the high voltage cables 94*a*, 94*b*. By the second control device 20, a desired electrical energy is supplied to the traction motor 16 to enable traveling of the fuel cell electric automobile 10.

In the embodiment of the present invention, the control unit is separated into the first control device 18 and the second control device 20. The second control device 20 is provided vertically below the fuel cell stack 14 and on the lateral side of the traction motor 16. Therefore, in comparison with the structure where the control unit having the first control device 18 and the second control device 20 formed as a single piece component and the traction motor 16 are arranged in the vertical direction, with the simple structure, it is possible to effectively reduce the height of the system as a whole. Accordingly, it becomes possible to improve the space efficiency of the fuel cell electric automobile 10.

Further, the first control device 18 and the second control device 20 are connected by the high voltage cable 94*a*, 94*b*. Thus, it is possible to reliably suppress entry of dust, etc. into the interiors of the first control device 18 and the second control device 20. Further, even if positions of the first control device 18 and the second control device 20 are changed individually (vibrations or displacement), the positional changes can be absorbed by flexibility of the high voltage cables 94*a*, 94*b* themselves advantageously.

Further, as shown in FIGS. 1 and 2, in the front view in the vehicle longitudinal direction, the high voltage cables 94*a*, 94*b* are positioned such that the high voltage cables 94*a*, 94*b* are not overlapped with the rear surface 14*e* of the fuel cell stack 14. Therefore, as shown in FIG. 1, when an external load (impact) F is applied to the fuel cell electric automobile 10 from the front side, and the fuel cell stack 14 contacts the partition wall member 12*w*, it is possible to reliably suppress damages of the high voltage cables 94*a*, 94*b*.

Moreover, the first connector 96 and the second connector 102 are covered with resin. In the plan view of the fuel cell stack 14, the first connector 96 and the second connector 102 are placed within the plane surface area of the fuel cell stack 14. Accordingly, in the event of collision, etc. of the fuel cell electric automobile 10, it becomes possible to suitably protect the first connector 96 and the second connector 102 covered with resin.

Further, the second connector 102 is provided vertically below the fuel cell stack 14, and vertically above the traction motor 16. Accordingly, in the event of collision, etc. of the fuel cell electric automobile 10 in a lateral direction, it is possible to suitably protect the second connector 102 by the traction motor 16.

Further, the fuel cell 22 is enclosed in the casing 24. In the state where the first control device 18 is provided within the upper surface area of the casing 24, the first control device 18 is fixed to the casing 24 using the screws 74. Accordingly, at the time of collision, etc. of the fuel cell electric automobile 10, it becomes possible to effectively protect the first control device 18, which is a high voltage component, by the casing 24. Further, since the first control device 18 is directly fixed to the casing 24 using screws, no separate mount structure is required, and thus, economical and simple structure is achieved.

Further, the traction motor 16 is provided such that the axial direction of the traction motor 16 extends in the vehicle width direction. The second control device 20 is provided on the front side of the traction motor 16 in the vehicle longitudinal direction and within an area of the size of the traction motor 16 in the vehicle width direction. Accordingly, in the event of collision, etc. of the fuel cell electric automobile 10 in a lateral direction, it becomes possible to suitably protect the second control device 20 by the traction motor 16.

Further, as shown in FIG. 5, the front end 20f of the second control device 20 in the vehicle longitudinal direction is spaced backwardly in the vehicle longitudinal direction from the front end 14f of the fuel cell stack 14 in the vehicle longitudinal direction by the distance S1. Accordingly, in the event of collision, etc. of the fuel cell electric automobile 10, the second control device 20, which is a high voltage component, can be protected effectively by the fuel cell stack 14 (casing 24).

Likewise, the front end 18f of the first control device 18 in the vehicle longitudinal direction is spaced backwardly in the vehicle longitudinal direction from the front end 14f of the fuel cell stack 14 in the vehicle longitudinal direction by the distance S2. Accordingly, the first control device 18, which is a high voltage component, can be protected effectively by the fuel cell stack 14 (casing 24).

Further, the rear mounts 72 and the motor mounts 76 are provided integrally with the coupling mount 78 to form a single piece component, and the coupling mount 78 is fixed to the second vehicle frame 13SF using screws. Accordingly, the number of components can be reduced, and improvement in the workability is achieved.

Further, the space 88 is formed between the lower surface of the fuel cell stack 14 and the upper surface of the traction motor 16. Accordingly, it becomes possible to reliably suppress influence of vibrations of the traction motor 16 on the fuel cell stack 14.

Further, the cell voltage detection device 104 for detecting the cell voltage of the fuel cell stack 14 is attached to the lower surface of the fuel cell stack 14. In the structure, in the event of collision, etc. of the fuel cell electric automobile 10, it is possible to protect the cell voltage detection device 104 by the fuel cell stack 14 (casing 24).

While the invention has been particularly shown and described with a reference to a preferred embodiment, it will be understood that variations and modifications can be effected thereto by those skilled in the art without departing from the scope of the invention as defined by the appended claims.

What is claimed is:

1. A fuel cell vehicle comprising:
   a fuel cell configured to generate electrical energy by electrochemical reactions of a fuel gas and an oxygen-containing gas;
   a traction motor driven by the electrical energy generated by the fuel cell;
   a first control device configured to control output of the fuel cell; and
   a second control device configured to control the electrical energy supplied to the traction motor,
   wherein the first control device is provided vertically above the fuel cell; and
   the second control device is provided vertically below the fuel cell and on a lateral side of the traction motor.

2. The fuel cell vehicle according to claim 1, wherein the first control device and the second control device are connected by a high voltage cable.

3. The fuel cell vehicle according to claim 2, wherein the high voltage cable is provided such that the high voltage cable is not overlapped with a rear surface of the fuel cell in a front view in a vehicle longitudinal direction.

4. The fuel cell vehicle according to claim 2, wherein a first connector connecting the high voltage cable and the first control device and a second connector connecting the high voltage cable and the second control device are provided within a plane surface area of the fuel cell in a plan view of the fuel cell.

5. The fuel cell vehicle according to claim 4, wherein the second connector is provided vertically below the fuel cell and vertically above the traction motor.

6. The fuel cell vehicle according to claim 1, wherein the fuel cell is enclosed in a fuel cell casing; and
   in a state where the first control device is provided within an upper surface area of the fuel cell casing, the first control device is fixed to the fuel cell casing.

7. The fuel cell vehicle according to claim 1, wherein the traction motor is provided such that an axial direction of the traction motor extends in a vehicle width direction; and
   the second control device is provided on a front side of the traction motor in a vehicle longitudinal direction and within an area of a size of the traction motor in the vehicle width direction.

8. The fuel cell vehicle according to claim 1, wherein a front end of the second control device in a vehicle longitudinal direction is provided on a back side in the vehicle longitudinal direction, with respect to a front end of the fuel cell in the vehicle longitudinal direction.

9. The fuel cell vehicle according to claim 1, further comprising:
   a vehicle frame provided below the fuel cell;
   a rear mount provided at a rear portion of the fuel cell in a vehicle longitudinal direction; and
   a motor mount provided at a rear portion of the traction motor in the vehicle longitudinal direction,
   wherein the rear mount and the motor mount are formed as a single piece component fixed to the vehicle frame; and
   a space is formed between a lower surface of the fuel cell and an upper surface of the traction motor.

10. The fuel cell vehicle according to claim 9, wherein a cell voltage detection device configured to detect cell voltage of the fuel cell is provided at the lower surface of the fuel cell and within a lower surface area of the fuel cell.

* * * * *